United States Patent [19]

Simons

[11] 4,353,763
[45] Oct. 12, 1982

[54] METHOD FOR MAKING PIPES, PLATES OR CONTAINERS FROM PLASTIC MATERIAL

[75] Inventor: Günter Simons, Troisdorf, Fed. Rep. of Germany

[73] Assignee: Henze GmbH, Troisdorf-Oberlar, Fed. Rep. of Germany

[21] Appl. No.: 261,714

[22] Filed: May 8, 1981

[30] Foreign Application Priority Data

May 13, 1980 [DE] Fed. Rep. of Germany ....... 3018194

[51] Int. Cl.$^3$ ............................................ B65C 31/00
[52] U.S. Cl. .................................... 156/184; 156/172; 156/195; 156/244.13; 138/141; 138/44; 138/146; 138/DIG. 3; 428/36; 428/265; 428/421; 428/522
[58] Field of Search ............... 156/195, 172, 173, 175, 156/190–192, 244.13, 244.15, 171, 184; 428/421–422, 36, 265, 268, 520, 522; 138/140, 141, 144–146, 124, 125, DIG. 3

[56] References Cited

U.S. PATENT DOCUMENTS

| | | | |
|---|---|---|---|
| 2,748,805 | 6/1956 | Winstead | 156/195 X |
| 3,452,506 | 7/1969 | Broerman | 156/195 X |
| 4,104,095 | 8/1978 | Shaw | 138/DIG. 3 |

Primary Examiner—David A. Simmons
Attorney, Agent, or Firm—Michael J. Striker

[57] ABSTRACT

Disclosed is a process for producing a composite tubular member of two or more plastic materials. The product tubular member is leach and acid resistant and has inner and outer layers of thermoplastic material and an intermediate layer of a thermosetting resins. The process comprises the steps of: disposing a first layer of a thermoplastic material about a heated winding element for forming the inner layer, wherein the first layer is formed of polyvinylidene fluoride; fusing overlapping adjacent edges of the layer of polyvinylidene fluoride; disposing a second intermediate layer of a thermosetting resin about the inner layer of polyvinylidene fluoride; disposing a third outer layer of polypropylene about the second layer of the thermosetting resin; and fusing the outer layer of polypropylene to the intermediate and inner layers of the thermosetting resin and the polyvinylidene fluoride, respectively.

6 Claims, 4 Drawing Figures

METHOD FOR MAKING PIPES, PLATES OR CONTAINERS FROM PLASTIC MATERIAL

BACKGROUND OF THE INVENTION

The present invention relates generally to plastic pipes, plates and containers, and more specifically, to a process for manufacturing the same.

Pipes and containers made of chemical resisting plastic materials which are defined for use in the chemical industry are usually made in accordance with the so-called winding method by helically winding a mandrel with one or a plurality of layers of a flat band made of plastic material in such a way that the adjacent edges of the flat band or the flat bands which overlap or engage the adjacent edges are welded together to a pipe with a smooth inner surface by pressing the plastic material together in a softened condition, for example, so that the pipe can be removed from the mandrel after cooling.

The winding method may be basically used for making pipes and plates made of polyvinylidene fluoride (PDVF) plastic material. From the economic point of view limits are set for the use of this material, since this material with a density of $1,78 \cdot cm^{-3}$ is very expensive when comparing with other known mass produced plastic materials.

Since the PVDF material has an excellent thermic stability and an extremely remarkable resistancy against the different chemical influences with low temperatures, as well as high temperatures and has an additional high life span resistancy with respect to the known mass produced plastics, there is considerable interest to economically make, in particular large volume pipes and elements for specific uses in the chemical industry from the material PVDF.

It was tried to reinforce a pipe or a plate made from PVDF plastic material with a wall thickness of 4 mm by means of glass fiber reinforced plastic material, thus providing a final product by combining more expensive and less expensive materials. However, such a solution has been shown of not being usable since such structures made of PVDF and GFK plastic material are used in the chemical industry, in particular in temperature ranges of about 343° K. to 413° K. or about 70° C. to 140° C., respectively, and are exposed to partly very high alternating temperatures of 293° K. to about 413° K., that means, from about 20° C. to 140° C. during the operation. It had been shown that the lifespan and the durability of such a material combination are considerably impaired due to the high alternating temperatures. This becomes clear, in particular in that the PVDF plastic material has a mean linear thermic expansion coefficient of $12 \cdot 10^{-5} K^{-1}$, while this value is at about 3.6 to $2.0 \cdot 10^{-5} K^{-1}$ with the glass fiber reinforced polyester resin. The expansion and above all the shrinking of the PVDF plastic material may be 3 to 6 times of the corresponding values of the glass fiber reinforced polyester resin, so that the GFK layer is expanding due to the stronger expansion characteristics and shrinking characteristics of the PVDF plastic material and detach from the thermoplastic inner liner made of PVDF plastic material, after a certain time period.

Against the foregoing background, it is an object of the invention to provide a method for making a pipe or a hollow element from thermoplastic plastic materials, for use in the chemical industry, which on the one hand has the required lifespan resistancy with respect to chemical influences and with respect to temperature alternating stresses and on the other hand can be made in a commercially feasable manner.

SUMMARY OF THE INVENTION

Due to the fact that the PVDF plastic material is at first wound around a heated mandrel in forms of bands or strips in accordance with the winding method, that the adjacent edges of the PVDF band overlap and combine with each other, due to pressure, one can use a PVDF band of a low thickness, for example, 2 to 5 mm and can make a commercial inner liner on the pipe or container tobe made which is resistant with respect to the most inorganic acids and base, whereby this inner liner is absolutely sealed due to the mutual welding of the adjacent edges of the helical shaped wound PVDF band and due to the subsequent winding with a polyester web and with an outer jacket made from the substantially less expensive polypropylene (PP) material an ideal support jacket is obtained, whereby the inserting of the polyester web as an adhesive takes care in a substantial manner that shearing forces which occur do not only have an effect on the different plastic layers but are absorbed by the total pipe or container wall. Thereby, the linear expansion coefficient of the polypropylene deviates only slightly with a value of from $15 \cdot 10^{-5} K^{-1}$ from the median linear thermic expansion coefficient of the PVDF of $12 \cdot 10^{-5} K^{-1}$ which eliminates the danger of detachment of the PVDF inner liner from the PP-outer jacket, even at very high temperature alternating stresses.

A particular intensive connection between the inner liner made of PVDF plastic material, the polyester web used as an adhesive and the support jacket made of polypropylene plastic material can be surprisingly obtained in accordance with a further method of the invention in that the mandrel is heated to a temperature which is higher than the melting temperature of the PVDF crystals of 451° K. or 178° C., respectively, during the winding operation.

In order to balance eventual differences in the shrinking and expansion characteristics of the combined material at extreme temperature alternating stresses by an additional heating or cooling one can, in accordance with the invention and with an additional operating step wind extruded polypropylene onto the total polypropylene surface of the winding element which can then be wound with a closed outer layer made of a PP band.

BRIEF DESCRIPTION OF THE DRAWINGS

The foregoing and still further objects and advantages of the present invention will be more apparent from the following detailed explanation of the invention in connection with the accompanying drawings wherein:

Referring now to FIGS. 1-4, which together illustrate schematically one embodiment for carrying out the inventive method, a winding device is shown.

Figure 1:
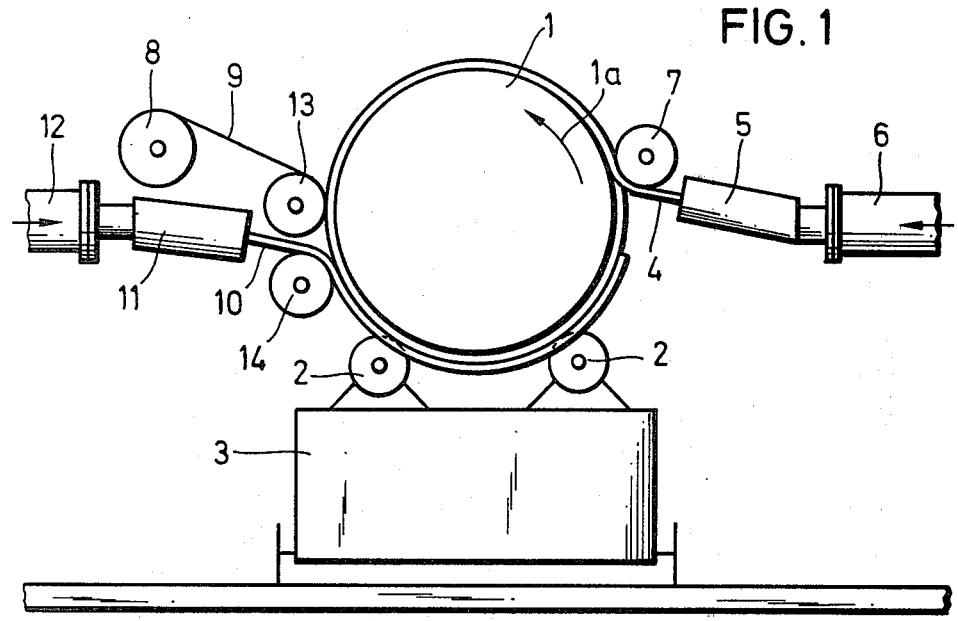
FIG. 1 is a schematic side view of a device for helical like winding of a pipe or container from a plurality of layers of plastic strips or bands which are discharged from jet nozzles of plastic extruders.

The winding device shown in the drawing essentially consists of a hollow cylinder mandrel 1 which is supported by rollers 2 of which at least one drives the mandrel 1 in the direction of arrow 1a of FIG. 1. Rollers 2 are mounted on a carriage 3 which is moveable in the longitudinal axis of mandrel 1 and may be displaced with a speed which is synchronized to the winding speed and the width of a plastic material strip 4 which consists of polyvinylidene fluoride (PVDF) and is fed from an extruder nozzle 5 of a PVDF extruder 6.

The mandrel 1 which is driven in the direction of the arrow 1a receives the band like strip 4 of PVDF plastic material which discharges from the extruder nozzle 5 of extruder 6, whereby the plastic material strip 4 is pressed against the circumference of mandrel 1 by a pressure device 7.

On the opposite side of the winding mandrel 1 there is one each feeding device 8 for a polyester web band 9 and for a further plastic material band 10 which discharges from nozzle 11 of a second plastic material extruder 12 and consists of polypropylene (PP) plastic material. The polyester web band, as well as the polypropylene band 10 are pressed against mandrel 1 by one each pressure device 13 or 14, respectively.

Figure 2:
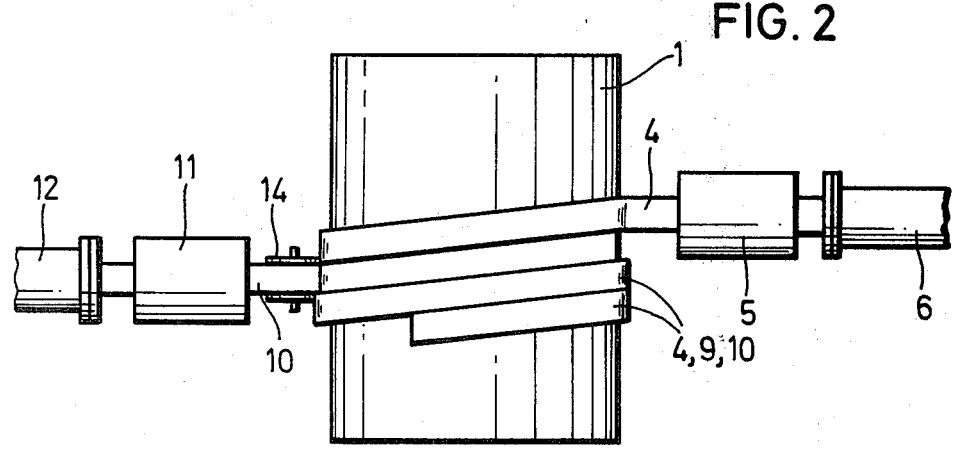
FIG. 2 is a plan view of the device of FIG. 1.

As can be seen in FIG. 2, the feeding device 8 for the polyester web band 9 is so arranged on the circumference of mandrel 1 that the polyester web band 9 is fed onto the outside of the already mounted PVDF band 4 after about 1.5 rotations of mandrel 1 and is subsequently covered by the subsequent fed polypropylene band 10.

Figure 3:
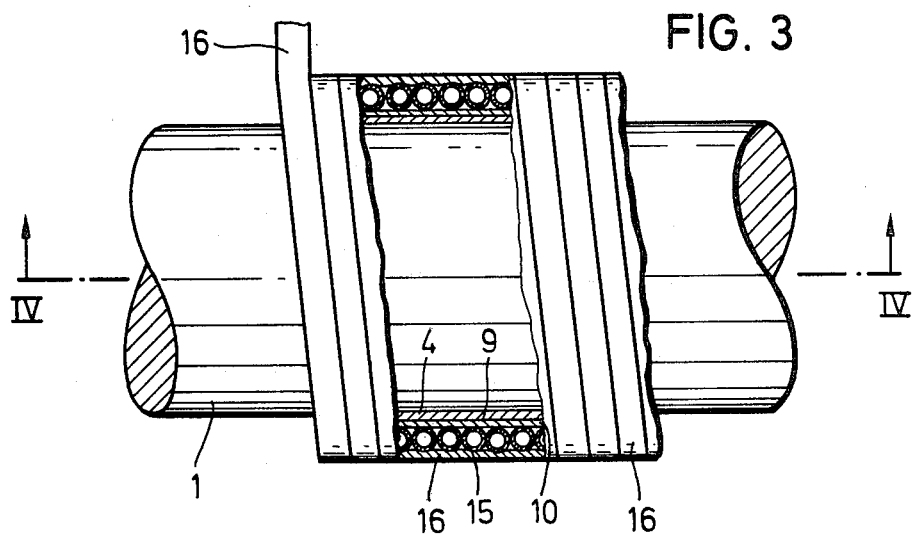
FIG. 3 is a partially broken, fragmentary view illustrating a polypropylene pipe wound and welded into a plastic pipe or container formed with the device of FIG. 1.
Figure 4:
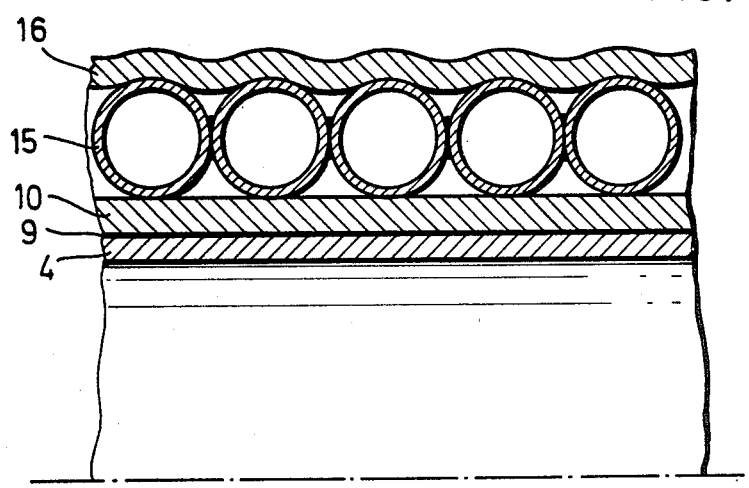
FIG. 4 is a schematic longitudinal sectional view through the pipe or the container in accordance with sectional line IV—IV of FIG. 3.

As shown in FIGS. 3 and 4, polypropylene pipes 15 with an outer diameter of about 20 mm to about 50 mm may be wound and welded onto the total polypropylene surface of the wound hollow element made in accordance with the method of FIGS. 1 and 2, in a further operating step. The pipes 15 are open on both ends and are endlessly connected with each other. Suitable armatures are mounted on the two pipe ends, so as to connect cooling or heating cycles. Thereby, it is possible to either cool or heat the pipe or plate which is made from the PVDF band 4 which is reinforced by the polyester web 9 and the outer mounted polypropylene band 10. Thereby, a balanced expanding and shrinking even at high temperature alternating stresses is assured and the deviating expansion coefficient of the polypropylene plastic material with respect to the expansion coefficient of the PVDF can be balanced in a simple manner. Subsequently, pipes 15 are wound with a polypropylene band 16 which forms a closed outer skin and protects the pipes 15 against damages.

While the invention has been illustrated and described as embodied in a method for making pipes, plates or containers from plastic material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for producing a composite plastic tubular member of two or more plastic materials, said tubular member being leach and acid resistant and having inner and outer layers of different thermoplastic materials and an intermediate layer of a thermosetting resin, said process comprising the steps of:
    (a) disposing a first layer of a thermoplastic material about a heated winding element for forming said inner layer, said first layer of thermo-plastic material being polyvinylidene fluoride;
    (b) fusing overlapping adjacent edges of said first layer;
    (c) disposing a second intermediate layer of a thermo setting resin about said inner layer of polyvinylidene;
    (d) disposing a third outer layer of a thermoplastic material about said second layer, said third layer of thermoplastic material being polypropylene;
    (e) fusing said outer layer of polypropylene to said first layer of polyvinylidene fluoride and said second layer of the thermosetting resin.

2. The process as recited in claim 1, wherein said intermediate layer is polyester.

3. The process as recited in claim 1, further comprising heating said winding element to a temperature higher then a melting temperature of polyvinylidene fluoride crystals.

4. The process as recited in claim 1, further comprising disposing a fourth layer of polypropylene about said third layer, said fourth layer being in the form of a second tubular member, and fusing said second tubular member to the first tubular member.

5. The process as recited in claim 2, further comprising heating said winding element to a temperature higher than 451° K.

6. The process as recited in claim 1, wherein said intermediate layer is polyester, said layer of polyester binding said inner layer of polyvinylidene fluoride and said outer layer of polypropylene to one another, such that a shearing force acting on said inner layer of polyvinylidene fluoride and on said outer layer of polypropylene through said product tubular member, is absorbed by substantially all of said inner, intermediate and outer layers of said tubular member, thereby substantially eliminating the possibility of detachment of said layer of polyvinylidene fluoride from said layer of polypropylene.

* * * * *